United States Patent

Furman et al.

[11] Patent Number: 5,859,897
[45] Date of Patent: Jan. 12, 1999

[54] TELEPHONE CALLING CARD AND SERVICE

[75] Inventors: Daniel Selig Furman, Summit; David G. Unger, Morristown, both of N.J.

[73] Assignee: AT&T Corp., Middletown, N.J.

[21] Appl. No.: 682,065

[22] Filed: Jul. 16, 1996

[51] Int. Cl.$^6$ ................................................ H04M 1/64
[52] U.S. Cl. .......................................... 379/88.01; 379/51
[58] Field of Search ................................. 379/67, 88, 89, 379/50, 51, 40, 52, 92.01, 93.03, 93.04, 114, 144

[56] References Cited

U.S. PATENT DOCUMENTS

| | | | |
|---|---|---|---|
| 4,928,302 | 5/1990 | Kaneuchi et al. | 379/88 |
| 5,353,335 | 10/1994 | D'Urso et al. | 379/67 |
| 5,450,477 | 9/1995 | Amarant et al. | 379/144 |
| 5,511,114 | 4/1996 | Stimson et al. | 379/114 |
| 5,546,449 | 8/1996 | Hogan et al. | 379/201 |
| 5,592,537 | 1/1997 | Moen | 379/144 |
| 5,631,904 | 5/1997 | Fitser et al. | 379/93.03 |

Primary Examiner—Fan S. Tsang

[57] ABSTRACT

A system and method of providing a telephone calling card service including the steps of providing a user with an access number to a telephone network and a personal identification code, prompting the user to input a personal identification code to initiate automatic dialing of at least one pre-selected telephone number associated with the personal identification code, and determining whether a call has been successfully completed to a called party via the pre-selected telephone number. The system may continue dialing pre-selected telephone numbers until a call has been successfully connected. In the alternative, the system may automatically and simultaneously dial all of the pre-selected phone numbers. An arrangement for determining whether an answering machine has answered a call is also provided. To implement the method, a telephone communications apparatus is used including a structure for recording a series of telephone numbers associated with a personal identification code, and a structure for retrieving the telephone numbers associated with the code and automatically dialing the telephone numbers until a call has been successfully completed to an individual.

14 Claims, 6 Drawing Sheets

TELEPHONE CALLING CARD AND SERVICE

TECHNICAL FIELD

The present invention is directed generally to a telephone calling card and service and, more particularly, to a system and method to facilitate locating and communicating with an individual or individuals, such as in an urgent situation where a child needs to locate and communicate with a parent or guardian in a simple manner.

BACKGROUND

Advances in technology have made individuals increasingly mobile. Although telephone technology has advanced so as to enhance communication ability, this increase in mobility often makes it particularly difficult to locate an individual with whom communication is desired, as it may be necessary to dial several phone numbers (home, office, etc.) to locate the individual.

Mobility has also led to widespread use of various telephone services, such as telephone calling cards. Of these calling cards, the use of pre-paid telephone cards has also become particularly widespread. For example, U.S. Pat. Nos. 5,353,335 and 5,511,114 illustrate two different forms of pre-paid telephone calling cards.

The implementation and use of such telephone calling cards and such advanced telephone technology, while convenient in many ways, has failed to address the needs of users who are often incapable of effectively utilizing telephone technology to locate and communicate with an individual or individuals, who may be at any one of several different telephone numbers. In particular, users such as children, the disabled and/or the elderly may find it particularly difficult and cumbersome to locate and communicate with an individual who may be at any one of several phone numbers. This difficulty can be compounded if communication with several individuals is desired. These problems can in fact become particularly acute in urgent situations where such communication can become vital.

SUMMARY OF THE INVENTION

The problems outlined above are solved in one example of the invention by a method involving the steps of: receiving at a communications network call setup information from a user, said call setup information including a personal identification code; in response to the receipt of said information dialing at least one pre-selected telephone number associated with said personal identification code; and determining at said communications network whether at least one call directed to said at least one pre-selected telephone number has been answered by at least one called party. This method may also involve the step of sequentially dialing a series of remaining pre-selected telephone numbers until one call is answered by a called party. In the alternative, the method may include the step of simultaneously dialing all of a plurality of pre-selected telephone numbers associated with the personal identification code and connecting the caller with each successful call. Additional features include the step of providing a called party with a location identifier of the caller upon inputting a location request code. Similarly, the problems outlined above are solved in another example of the invention by a telephone communication apparatus which includes various structures for carrying out the above-referenced steps.

DETAILED DESCRIPTION

With reference to the attached drawings, several embodiments of the present invention will now be described in detail.

In one example of the invention, a disposable pre-paid card may be purchased from a telecommunications services provider. The card represents a predetermined number of calling units on the network of the services provider. Although such a pre-paid card would be of use to anyone in need of telecommunications' services, it would be particularly advantageous for individuals who are often incapable of effectively utilizing telephone technology to locate and communicate with an individual (or individuals) who may be at any one of a number of different telephone numbers. In particular, users such as children, the disabled and/or the elderly may find such a card useful. The card may be obtained directly from the telecommunications services provider or may be obtained from an intermediary which has purchased the card from the telecommunications services provider.

To access a telecommunications system in accordance with this invention, a cardholder dials a specific toll free number, such as an 800 number (for example, 1-800-CALL-ATT) to communicate with the telephone system. The system will prompt the cardholder to enter or speak a personal identification code, such as the user's name, so that the card/caller may be verified, the available balance determined, and the desired calls completed, if there is a sufficient credit balance. If there is an insufficient credit balance, the operator may intervene to ascertain whether the call has been made in an emergency situation and/or whether the call may be made on a collect basis.

The system decrements the balance associated with the card when the call is in progress and keeps track of the call duration that the customer is allowed for the call which is being made. If the customer's balance depletes before the end of the call, an announcement is played and/or the operator may intervene for appropriate handling of the call. If the card still has an available credit balance when the call is finished, the customer is informed of the remaining available balance. For use with individuals such as children, the disabled and/or the elderly, a statement may be mailed to a particular address to assure that sufficient credit is applied to the calling card by a responsible individual.

Although the present system has been described as a pre-paid calling card system, it should be understood that other forms of payment may also be utilized, such as connecting the calling card to a credit card for payment and/or utilizing the instant card on a collect call basis.

Figure 1:
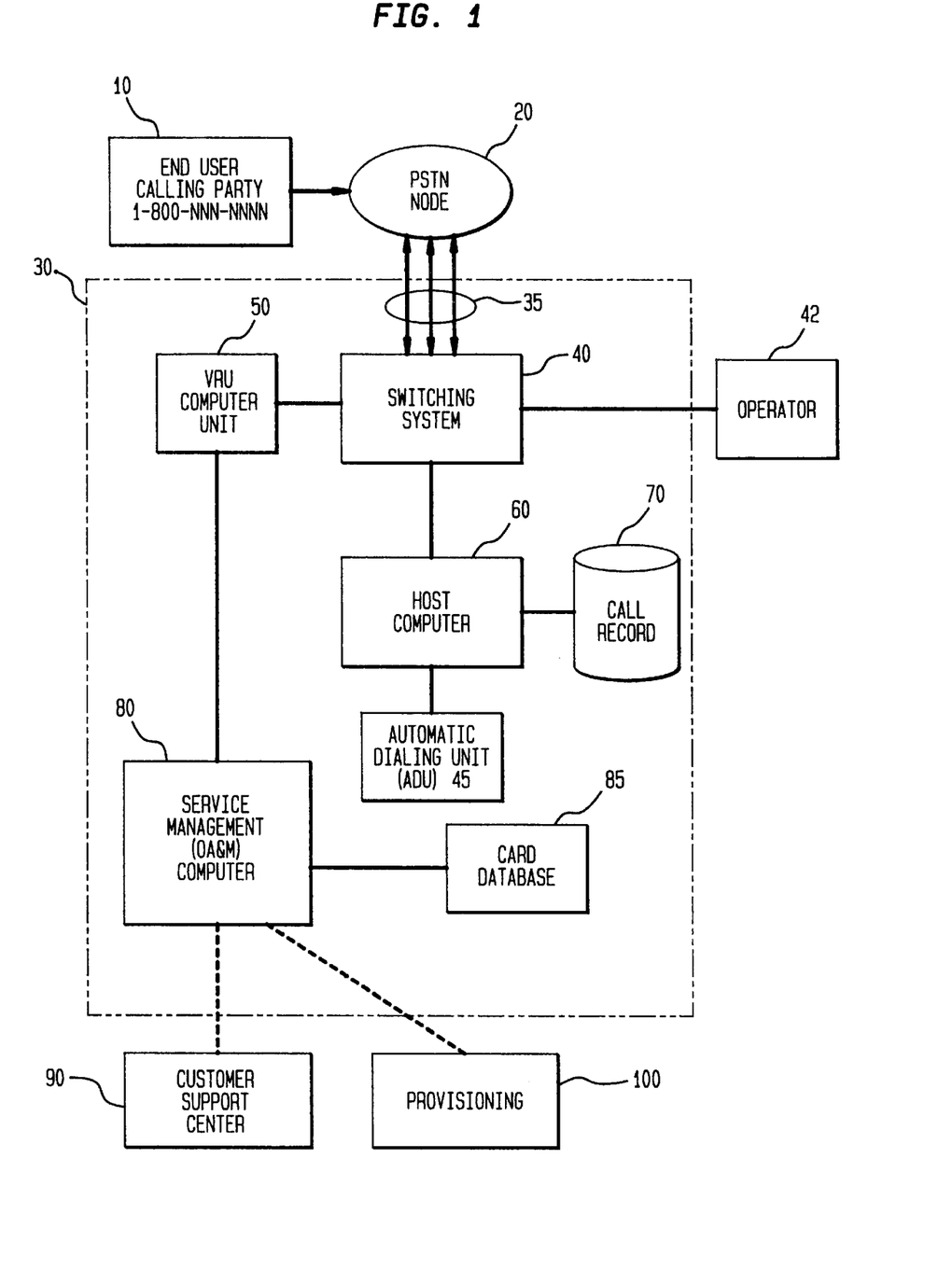
FIG. 1 illustrates a telephone network in accordance with the telephone calling card and service of the present invention.

FIG. 1 shows an example of circuit architecture which constitutes an example of the calling card system in accordance with the present invention. The system permits a calling party to make a telephone call to a called number or series of numbers without the need for the caller to have a large supply of currency or a particular credit card—thereby permitting currently available paid phones to be used. The calling party is connected to the called number through one or more nodes in a public switched telephone network (PSTN). FIG. 1 shows an interaction between an end user or calling party 10 with one PSTN node 20. The node 20 may comprise a telecommunications switching system located in a central office. The switching system may be a switching system located in a network provided by a local exchange carrier (LEC) such as one of the regional bell operating companies. The switching system may, for example, be an AT&T 4ESS® or 5ESS® switching system. Typically, there are plurality of nodes 20 in a public switched telephone network.

In addition to the network node 20, the architecture of FIG. 1 includes a platform 30 connected to the network node 20. The platform 30 may be co-located with the network node 20 or remotely located with respect to the node 20. The platform effectuates the calling card service of the present invention in conjunction with the usual equipment contained in a public switched telephone network. The platform 30 contains an end office digital switching system 40 connected to the network node 20 via one or more central office trunk facilities collectively designated by reference numerical 35. For example, the switching system 40 may be connected to the central office switching system in node 20 by one or more conventional T1 trunks, ISDN channels, or analog lines, as needed. The switching system 40 performs call processing functions for telephone calls between the platform 30 and the network node 20. The call processing functions of the switching system 40 are controlled by a host computer 60 operating in conjunction with a call record database 70. An automatic dialing unit (ADU) 45 interacts with host computer 60 to automatically dial any recorded telephone numbers. An operator 42 may also interact with the switching system 40. It is to be understood that a back-up switching system, host computer, and call record database may also be used to serve as redundant systems in the event of primary system failure.

The calling card service platform 30 also contains a voice response computer unit (VRU) 50 which performs voice response functions related to call setup and call takedown. The VRU computer 50 communicates with the caller to assist the caller in reaching the desired parties. The VRU computer 50 is connected to the switching system 40 through appropriate communication lines.

The architecture of FIG. 1 also contains a service management computer 80 which manages a card database 85 containing relevant information about each outstanding card such as the current balance for each card, as well as a series of pre-selected telephone numbers associated with each personal identification number and calling card. In addition to managing the card database 85, the service management computer 80 also performs operations, administration, and maintenance (OA&M) operations for the platform 30. The service management computer 80 also provides a gateway for remote access to the pre-paid services platform 30. For example, there may be a customer support center 90 which is capable of reading the information contained in the platform 30 and a provisioning system 100 which is able to read-in information already in the platform, as well as write other information into the platform, such as updates to the information stored in the card database 85 (pre-set telephone numbers, etc.) and entry of new software into the platform 30.

It is to be understood that redundant systems may also be used to back-up each of the aforementioned elements of FIG. 1.

Figure 2:
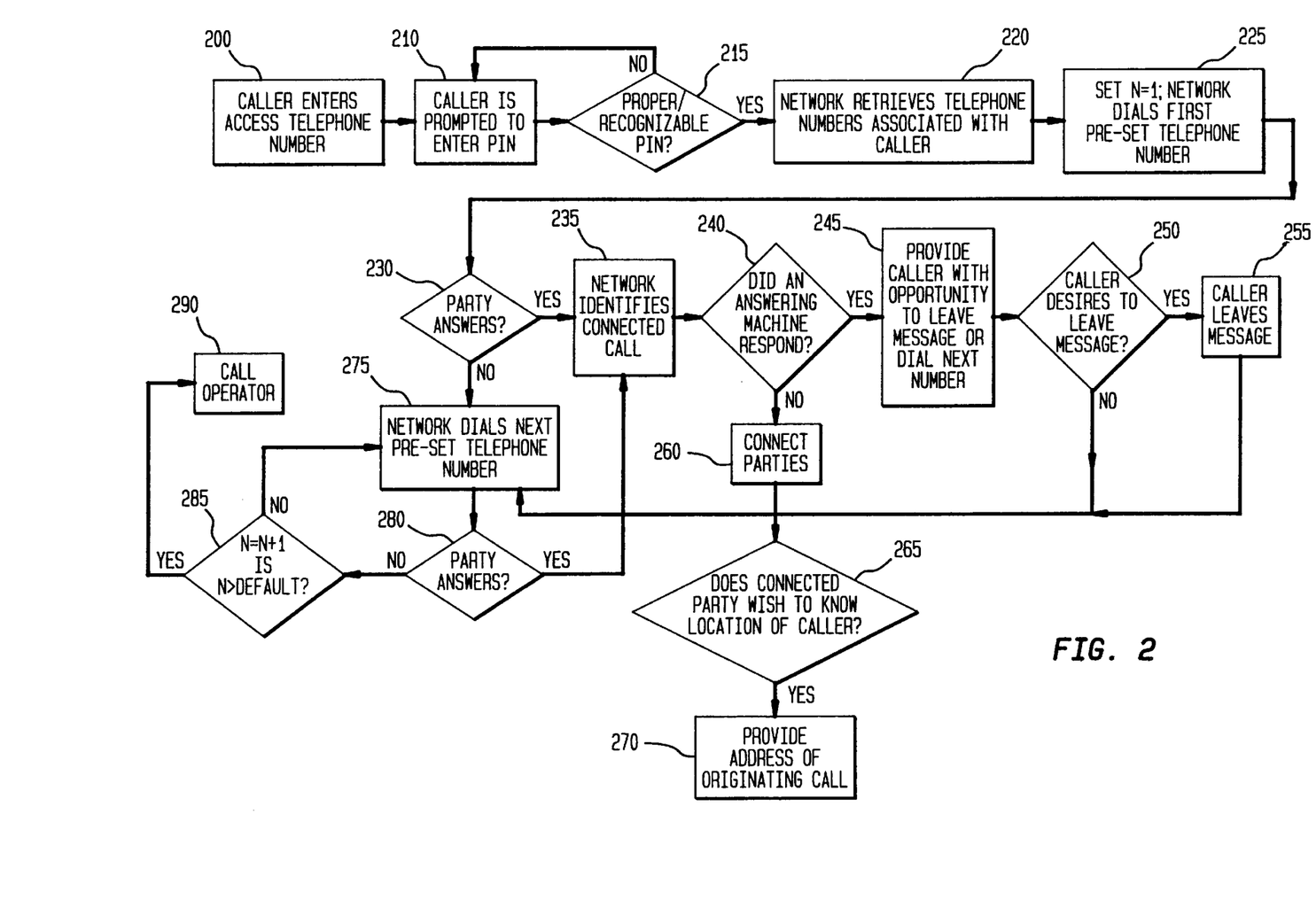
FIG. 2 is a flowchart outlining the process of one embodiment of a telephone calling service in accordance with the present invention.

With reference to FIG. 2, the following description of a call flow represents the caller's interaction with the pre-paid services platform 30. At step 200, the caller enters a network access telephone number, such as 1-800-CALL-ATT. The system prompts the caller to enter some form of personal identification code or number at step 210. The personal identification code may take the form of the user's name, or the user's name followed by some number to account for a plurality of individuals having the same name. If the system recognizes the personal identification number at step 215, the system proceeds at step 220 to retrieve a series of pre-set telephone numbers associated with that caller from its database 85. The network then initiates dialing a first pre-set telephone number at step 225. At this juncture, N, the number of calls made by the system, is set to one. If a party answers the call at step 230, the system proceeds to identify that a call has been connected, such as by saying "Mom's office" at step 235, so that the caller understands with whom the call has been connected. The system proceeds to determine whether an answering machine has in fact responded (in lieu of an individual) at step 240. If an answering machine has responded, the system allows the caller to either leave a message or have the system dial the next number at steps 245 and 250. If the caller desires to leave a message via step 250 either by pressing an appropriate code on the dial pad or by uttering the appropriate code, the caller may leave a message at step 255 and then the system will proceed to dial the next pre-set number at step 275. If the caller however desires to have the system dial the next number at step 250 (without leaving a message), the caller may input or say a code such as "**X" so that the network proceeds to dial the next pre-set telephone number at step 275. If an answering machine had not responded at step 240, the parties are connected at step 260. The system will continue to dial pre-set telephone numbers at step 275, 280 and 285 until a party answers at step 280. If no party answers, the system via step 275 continues to dial pre-set telephone numbers until the number of calls made (N) surpasses some default level. Should the number of calls surpass this default level, an operator may intervene at step 290 so that, if an emergency situation exists, the operator may proceed to call the police, or other emergency service. As such, the present invention, although not intended to replace 911 services, may be particularly useful in urgent situations.

In an emergency, if the connected party wishes to know the location of the caller, such as a parent wishing to know where their child is calling from, a code such as "*LOC" may be entered and the system will respond with a location identifier to indicate the origin of the call at step 270. The system could also prompt the called party to request information regarding the location of the caller. This is analogous to the E911 services available in many parts of the United States, in which 911 operators may obtain information about the location of the caller.

As such, the present invention allows individuals, such as children, to locate and talk by phone with a parent or guardian in a simple manner. In an emergency situation, the present invention could also help reach the police, fire department, or an ambulance. A parent may purchase a special pre-paid card from the telephone network provider, which is then given to the child. Both the 800 number and the personal code (such as the child's name) will be printed on the card. Therefore, if the child is injured, another individual may place the call, even without knowing the specific telephone numbers (such as the child's home number, their parents' office number, etc.) recorded in the system. In addition, because the card can only be utilized to call the numbers recorded in the system, the possibilities of fraudulent use of the card are minimized.

The actual sequence of the pre-set telephone numbers may be created when the card is either purchased by interacting with a voice response unit or with a customer service representative, or through a mail-in card.

Figure 3:
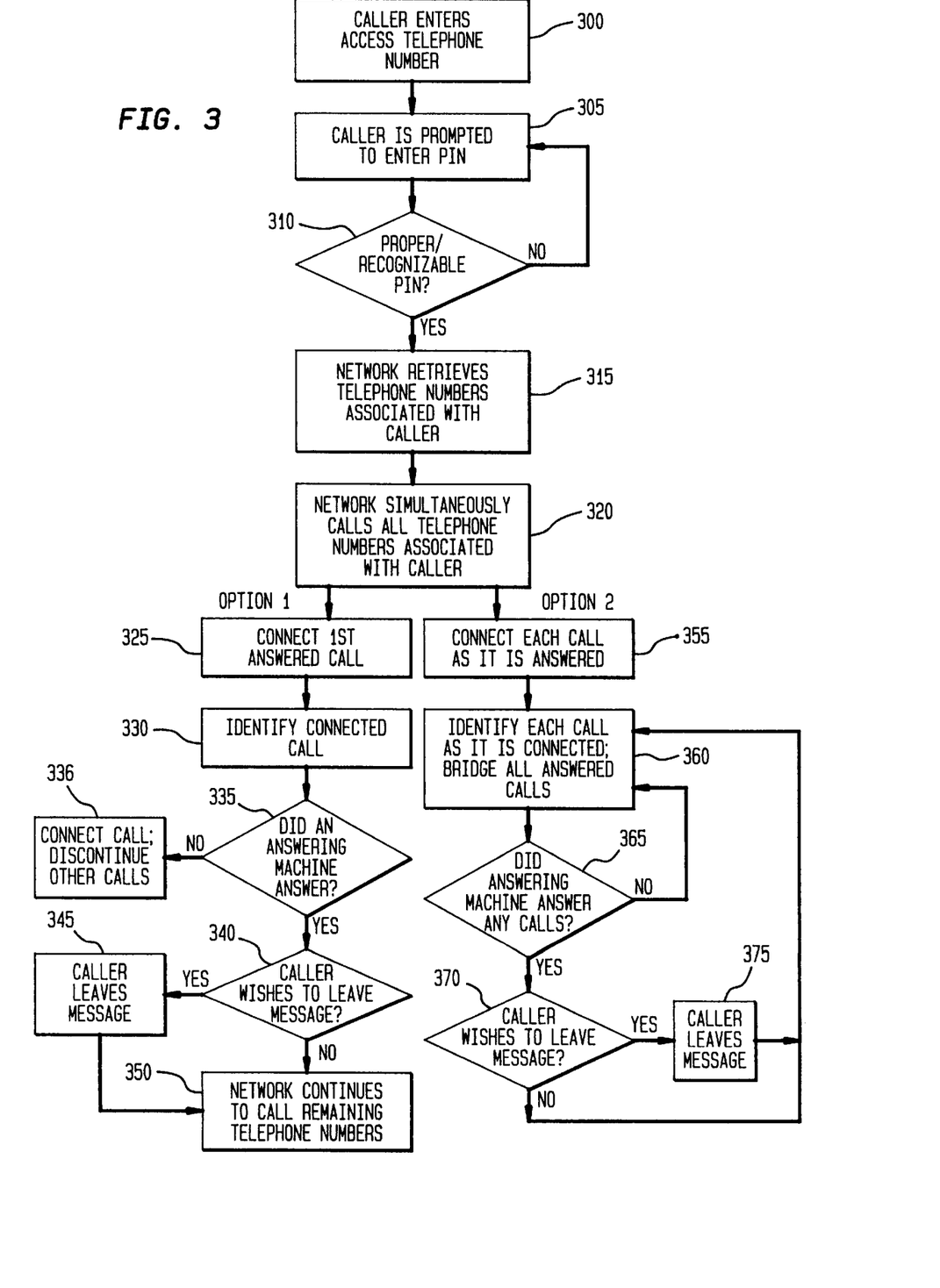
FIG. 3 is a flowchart illustrating another embodiment of the telephone calling service in accordance with the present invention.

An alternative embodiment of the present invention is shown in FIG. 3. Steps 300, 305, 310 and 315 are similar to corresponding steps of the embodiment shown in FIG. 2. However, at step 320, the network simultaneously calls all the pre-set telephone numbers associated with the caller. There are two possibilities for such an arrangement. In the first arrangement, the system connects to the first individual who answers the call. If the first answered call is answered by an answering machine and the individual does not wish to leave a message, the individual could input a code, such as "X", to cause the network to disconnect the call and the remaining numbers would be dialed. In the alternative, instead of connecting to the first call that is answered, all calls that are answered within a time limit could be bridged together. In such an instance, answering machines may again pose a problem, though the service would still serve its purpose even if an answering machine was connected in the bridge of calls. To alleviate this problem, the system may, at the time the number sequence is designated, provide a voice tag on the number such as "home, 1", "Mom's office, 2", etc. When a call is connected, it would be announced by the system (e.g. "Dad's office, 3"). If it is determined that an answering machine answered the call, it could be then disconnected with the code such as"3X", with the "3" indicating Dad's office.

Such an arrangement is shown in FIG. 3 where the first arrangement is shown in steps 325–350, while the second arrangement is shown in steps 355–375 . In particular, at step 325, the network connects the first answered call and identifies the connected call at step 330. At step 335, the system determines whether an answering machine has answered the call. If an answering machine has not answered the call, the call is connected and the remaining calls are discontinued at step 336. If in fact an answering machine has answered, the caller at step 340 may decide to leave a message, as in step 345, or the system may proceed at step 350 to continue to call the remaining telephone numbers. With respect to the second option, at step 355, the system will connect each call as it is answered. In addition, the system will identify each call as it is connected and bridge all answered calls together at step 360. If it is determined that an answering machine answered any of the calls at step 365, the caller, at step 370, may decide to leave a message as in step 375. Otherwise, the system proceeds to identify each call at step 360 as it is connected, and bridge all answered calls together.

In this system, the call recipient(s) could enter a code and the system will tell the call recipient(s) the address from which the call is originating. Considering the very special nature of the call, privacy considerations should not be an issue.

Figure 4:
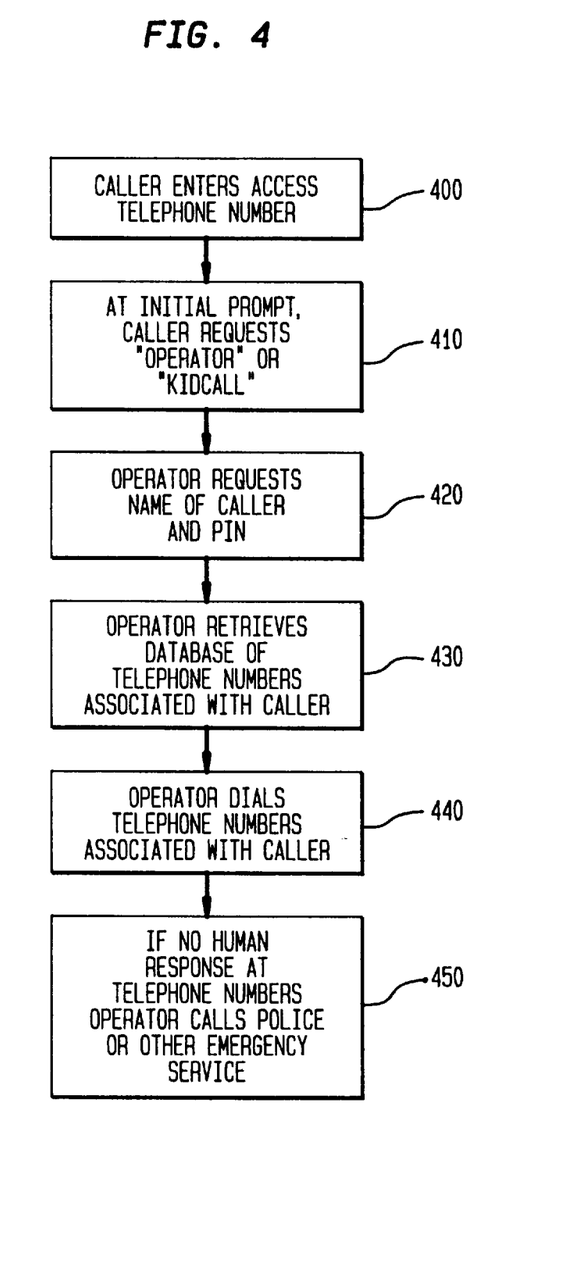
FIG. 4 is a flowchart illustrating another embodiment of the telephone calling service in accordance with the present invention.

With reference to FIG. 4, a different approach, perhaps more suitable for emergency situations, is shown. In this arrangement, a child may call a number such as 1-800-CALL-ATT and at the initial prompt say "operator" or perhaps "kidcall" (and if voice recognition does not work, press "00"). This would connect the call to a live operator. The child would then say their name and town, or some form of personal code. With this information, the operator could pull-up a file with the pre-set sequence of telephone numbers in an attempt to reach a parent or guardian. Again, should no one be reachable, the operator can call the police, fire department, or an ambulance, if necessary. In such an instance, this arrangement and capability may also be pre-paid, perhaps on a subscription basis, and the appropriate number sequence provided. The call origination location information could also be given to the parent. With particular reference to FIG. 4, such a system is shown in which the caller enters an access telephone number at step 400, at an initial prompt the caller requests "operator" or "kidcall" at step 410, and the operator will request the name of the caller or some form of personal identification at step 420. The operator then proceeds to retrieve a database of telephone numbers associated with the caller at step 430 and proceed to dial these phone numbers at step 440. Alternately, if no human response is received at any of the telephone numbers, the operator may call the police or other emergency service at step 450.

Figure 5:
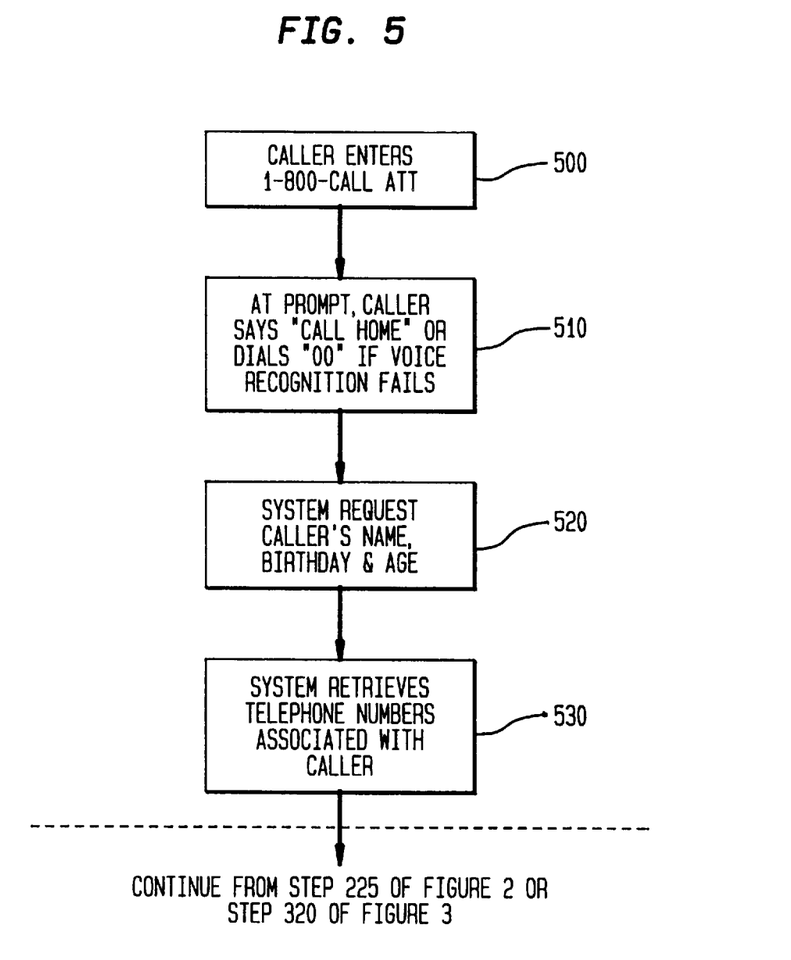
FIG. 5 is another flowchart illustrating yet another embodiment of the present invention in which an operator interacts with the caller to implement a calling card service in accordance with the present invention.

Another alternative arrangement is shown in FIG. 5 in which the child may call the 1-800-CALL-ATT, or other access number, and at the prompt say "call home" (or if the voice recognition does not work, the user may press "00") and then be prompted to give their birthday and age, as well as their name. Based on this information, the system will be able to identify the child and begin any of the sequence of call options (simultaneous or sequential) discussed above. With particular reference to FIG. 5, the caller (1) enters the access phone number at step 500, (2) at the prompt the caller says "call home" (or dials "00" if voice recognition fails) at step 510, (3) the system requests the caller's name, birthday and age at step 520, (4) the system then retrieves the telephone numbers associated with the caller at step 530, and (5) the system then proceeds with the procedures outlined in FIGS. 2 and 3.

Figure 6:
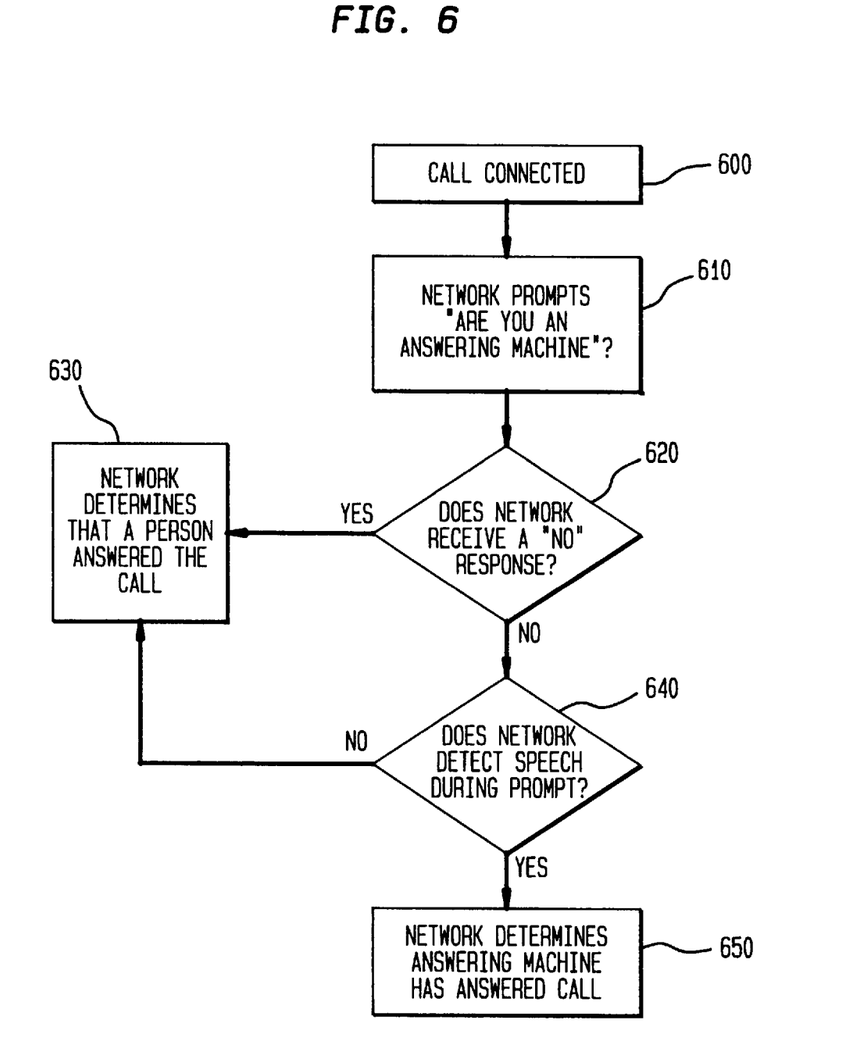
FIG. 6 is a flowchart which outlines a method in which the system of the present invention determines whether an answering machine has answered a particular call.

With reference to FIG. 6, one approach for answering machine identification is shown. In this approach, the network queries the called party to determine whether it is an answering machine, such as by playing a pre-recorded message: "Are you an answering machine?". If there is speech (that could be an answering machine) while the question is being asked, it is very unlikely that such speech would be live human behavior. In addition, if a "no" response is received, it is unlikely that an answering machine has answered the call. With particular reference to FIG. 6, once the call is connected at step 600, the network prompts the question "Are you an answering machine?" at step 610. If the network receives a "no" response at step 620, the network then determines that a person answered the call at step 630. However, if the network does not receive a "no" response, the network continues to analyze whether or not speech was detected during the prompt of "Are you an answering machine?" at step 640. If no speech was received during that prompt, the system determines that a person in fact answered the call at step 630. If however speech was detected during the prompt, the system determines that an answering machine answered the call at step 650.

It should be understood that the specific embodiments disclosed and described above may be readily utilized as a basis for modifying or designing other structures for carrying out the same purposes of the present invention. It should also be realized by those skilled in the art that such equivalent constructions do not depart from the spirit and scope of the invention as is set forth in the appended claims. Accordingly, the aforementioned description of the preferred embodiments is to be deemed as exemplary in nature, and the scope of the present invention is to be defined by the appended claims.

What is claimed is:

1. A method of providing a communications service, comprising the steps of:
   receiving at a communications network call setup information from a user, said call setup information including a personal identification code;
   in response to the receipt of said information, dialing at least one pre-selected telephone number associated with said personal identification code;
   determining at said communications network whether at least one call directed to said at least one pre-selected telephone number has been answered by at least one called party; and
   providing said at least one called party with a location identifier in response to said at least one called party inputting a location request code.

2. The method of claim 1 wherein a ring-no-answer condition results from a first call directed to a first pre-selected telephone number and wherein said dialing and determining steps further include the step of:
   in response to said ring-no-answer condition, sequentially dialing any remaining pre-selected telephone numbers until one call is answered by a called party.

3. The method of claim 1 wherein said at least one call is answered by an answering machine and wherein said method further includes the step of:
   prompting the user to decide whether to leave a message on said answering machine.

4. The method of claim 3 further comprising the step of:
   sequentially dialing any remaining pre-selected telephone numbers, irrespective of whether the user leaves a message on said answering machine.

5. The method of claim 1 wherein said personal identification code is a user's name.

6. The method of claim 1 further comprising the step of transmitting from said communications network a message identifying the calling party upon receiving an answer supervision signal from a called party.

7. A method of providing a communications service, comprising the steps of:
   receiving at a communications network call setup information from a user, said call setup information including a personal identification code;
   in response to the receipt of said information, simultaneously dialing from said communications network all of a plurality of pre-selected telephone numbers associated with said personal identification code; and
   dialing an emergency service when all calls directed to said pre-selected telephone numbers went unanswered by a human being.

8. A telecommunications apparatus, comprising:
   means for recording a series of telephone numbers associated with a personal identification code; and
   means for retrieving said telephone numbers associated with said personal identification code, for automatically dialing at least one of said series of telephone numbers in response to said personal identification code until a call has been successfully completed to an individual at one of said telephone numbers, and for providing a called party with a location identifier in response to said called party inputting a location request code.

9. The telecommunications apparatus of claim 8 wherein said means for retrieving and for automatically dialing performs the function of simultaneously calling each of said series of telephone numbers.

10. The telecommunications apparatus of claim 8 further comprising:
    means for determining if there is a pre-determined amount of credit associated with an account corresponding to said personal identification code; and
    means for determining an available duration of a telephone call based on the credit and nature of a destination telephone number.

11. A public switched telephone network, comprising:
    at least one central office switching system; and
    a services system associated with at least one central office switching system, said services system comprising: a database of pre-selected telephone numbers each corresponding to a personal identification code, a sound analysis system comprising a transmitter to send a pre-recorded message and a receiver to determine whether a call has been answered by an answering machine, and an automatic dialing system comprising a computer to automatically call said preselected telephone numbers until a call is successfully completed to an individual and to provide a called party with a location identifier in response to said called party inputting a location request code.

12. A telecommunications apparatus, comprising:
    a storage device which contains a plurality of telephone numbers associated with a personal identification code; and
    a processor which is connected to said storage device and which retrieves said telephone numbers associated with said personal identification code in order to (a) automatically dial via an automatic dialing unit at least one of said plurality of telephone numbers in response to said personal identification code until a call has been successfully completed to an individual at one of said telephone numbers and (b) provide a called party with a location identifier in response to said called party inputting a location request code.

13. The telecommunications apparatus of claim 12 wherein said automatic dialing unit simultaneously calls each of said telephone numbers.

14. The telecommunications apparatus of claim 12 further comprising:
    means for determining if there is a pre-determined amount of credit associated with an account corresponding to said personal identification code; and
    means for determining an available duration of a telephone call based on said credit and nature of a destination telephone number.

* * * * *